S. HULDT.
METHOD OF CONVERTING ZINC POWDER INTO LIQUID ZINC.
APPLICATION FILED APR. 3, 1917.

1,266,808.

Patented May 21, 1918.

Sven Huldt
Inventor
By Albert E. Parker
Attorney.

UNITED STATES PATENT OFFICE.

SVEN HULDT, OF STOCKHOLM, SWEDEN, ASSIGNOR TO NORSK ELEKTRISK METAL-INDUSTRI AKTIESELSKAP, OF SARPSBORG, NORWAY.

METHOD OF CONVERTING ZINC POWDER INTO LIQUID ZINC.

1,266,808.   Specification of Letters Patent.   Patented May 21, 1918.

Application filed April 3, 1917. Serial No. 159,509.

*To all whom it may concern:*

Be it known that I, SVEN HULDT, residing at Stockholm, Sweden, have invented certain new and useful Improvements in the Methods of Converting Zinc Powder into Liquid Zinc, of which the following is a specification.

In the manufacture of zinc a certain amount of poussière or zinc powder is obtained, which is generated during the operation of condensing the diluted zinc vapors, which are not condensed to liquid zinc.

The present invention has for its object to take care of such zinc powder by converting the same to liquid zinc, and consists in introducing the powder in a movable internally heated furnace, in which the zinc powder is heated to the smelting temperature of the zinc. Owing to the movement of said furnace, the zinc powder is subject to a rubbing operation, so that its external layer or shell, consisting of zinc oxid, is loosened, whereby, (the temperature in the furnace being adapted correspondingly), the zinc melts to liquid form and the zinc oxid is separated.

The process may be discontinuous or continuous at will. In the first mentioned case a determined amount of zinc powder is introduced in the furnace, which then is heated and put into motion, say in a slow, rotating motion. The zinc oxid is thereby separated from the zinc powder and may be drawn off through suitable openings. When all zinc poussière or powder is melted, forming liquid zinc, the furnace is stopped and the zinc is tapped.

In the second mentioned case the introduction of fresh material is made continuous, and the tapping is made continuous or intermittent, as the case may be.

Figure 1:
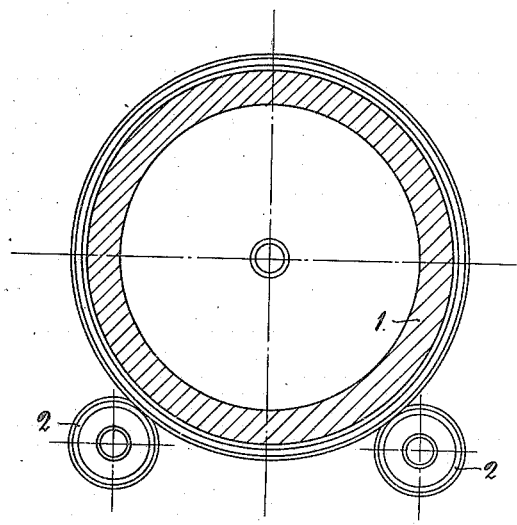
Figure 2:
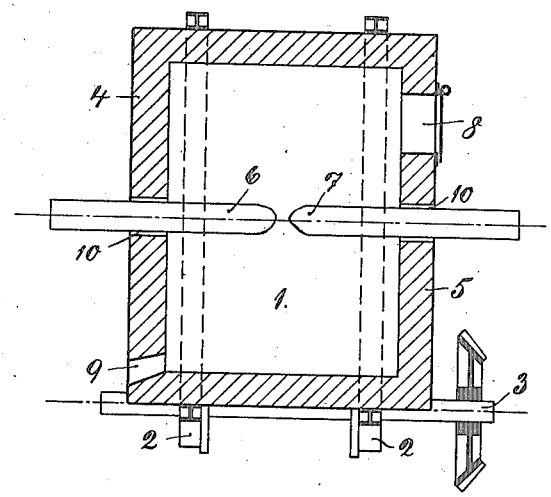

The accompanying drawing shows a furnace for carrying out the method above described. Figure 1 is a transverse section and Fig. 2 a longitudinal section of the furnace.

The furnace consists of a drum 1, which may have any convenient form, cylindrical, spherical, conical or the like, and which is mounted on rolls 2, by means of which the drum may be put in motion from a driving shaft 3. Centrally through the holes 10 in the ends 4, 5 of the drum electrodes 6, 7 are inserted for generating an electric arc for heating the drum internally to the required temperature.

Through an opening 8, which then is closed, zinc powder is introduced in the drum 1, and through the tapping hole 9 the liquid zinc is tapped, whereas the zinc oxid is withdrawn in any convenient manner.

The drum may also have a rocking motion, if required instead of a rotating motion.

Having now fully described my invention, what I claim is:

1. The method of converting zinc powder into liquid zinc, consisting in heating the zinc powder to the melting temperature of the zinc, and subjecting the powder to a rubbing operation.

2. The method of converting zinc powder into liquid zinc, consisting in heating the zinc powder to the melting temperature of the zinc by means of an electric arc, and simultaneously subjecting the powder to a rubbing operation.

3. The method of converting zinc powder into liquid zinc, consisting in introducing the powder in an electric furnace, heating the powder to the melting temperature of the zinc, and rotating the furnace so as to subject the powder to a rubbing operation.

In testimony whereof I have signed my name to this specification in the presence of two subscribing witnesses.

SVEN HULDT.

Witnesses:
    WALDEMAR BOMAN,
    GRETA PRIEN.